(12) United States Patent
Zhou et al.

(10) Patent No.: US 8,682,182 B2
(45) Date of Patent: Mar. 25, 2014

(54) BLIND CARRIER FREQUENCY OFFSET DETECTION FOR COHERENT RECEIVERS USING QUADRATURE AMPLITUDE MODULATION FORMATS

(75) Inventors: Xiang Zhou, Holmdel, NJ (US); Yifan Sun, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 245 days.

(21) Appl. No.: 13/109,853

(22) Filed: May 17, 2011

(65) Prior Publication Data

US 2012/0294630 A1    Nov. 22, 2012

(51) Int. Cl.
*H04B 10/06* (2011.01)
(52) U.S. Cl.
USPC ............................. 398/208; 398/202
(58) Field of Classification Search
USPC ...................... 398/79–95; 375/326
See application file for complete search history.

(56) References Cited

U.S. PATENT DOCUMENTS

| | | | | |
|---|---|---|---|---|
| 5,471,508 | A * | 11/1995 | Koslov | 375/344 |
| 5,687,163 | A * | 11/1997 | Fox et al. | 370/207 |
| 5,805,797 | A * | 9/1998 | Sato et al. | 714/48 |
| 6,449,071 | B1 * | 9/2002 | Farhan et al. | 398/79 |
| 7,254,189 | B1 * | 8/2007 | Kazakevich et al. | 375/326 |
| 7,346,279 | B1 * | 3/2008 | Li et al. | 398/32 |
| 2002/0163705 | A1 * | 11/2002 | Bakker et al. | 359/239 |
| 2004/0184519 | A1 * | 9/2004 | Melsa et al. | 375/222 |
| 2007/0092041 | A1 * | 4/2007 | Kim et al. | 375/329 |
| 2009/0160576 | A1 * | 6/2009 | Dent | 333/139 |
| 2010/0202544 | A1 * | 8/2010 | Osseirar et al. | 375/260 |

OTHER PUBLICATIONS

Jumpei Hongou, et al., "1 Gsymbol/s, 64 QAM coherent optical transmission over 150 km with a spectral efficiency of 3 bit/s/HZ", 2007 Optical Society of America, OFC 2007, Paper OMP3.
Yojiro Mori, et al., "200-km transmission of 100-Gbit/s 32-QAM Dual-Polarization Signals using a Digital Coherent Receiver", ECOC 2009, Sep. 20-24, 2009, Vienna, Austria.
Xiang Zhou, et al., "32Tb/s (320×114Gb/s) PDM-RZ-8QAM transmission over 580km of SMF-28 ultra-low-loss fiber", 2009 Optical Society of America, OSA/OFC/NFOEC 2009.
Peter J. Winzer, et al., "112-Gb/s Polarization-Multiplexed 16-QAM on a 25-GHz WDM Grid", ECOC 2008, Sep. 21-25, 2008, Brussels, Belgium.
Xiang Zhou, et al.,"200-Gb/s PDM-16QAM generation using a new synthesizing method", ECOC 2009, Sep. 20-24, 2009, Vienna, Austria.
Akihide Sano, et al., "240-Gb/s Polarization-Multiplexed 64-QAM Modulation and Blind Detection Using PLC-LN Hybrid Integrated Modulator and Digital Coherent Receiver", ECOC 2010, PD 2.2.

(Continued)

*Primary Examiner* — Leslie Pascal
*Assistant Examiner* — Casey Kretzer
(74) *Attorney, Agent, or Firm* — Hoffmann & Baron, LLP (57) ABSTRACT

Exemplary embodiments are directed to a blind carrier recovery system for blind detection and/or correction of carrier frequency offset between the signal laser source and local oscillator (i.e., carrier frequency recovery) for optical systems employing quadrature amplitude modulation (QAM). Exemplary embodiments can be implemented using an improved fast Fourier transform (FFT)-based approach. Some embodiments can include a frequency sign detection technique that uses parallel, concurrently implemented FFTs having a modified FFT architecture. Some embodiments can include a frequency sign detection technique that uses time-domain slope detection based on constellation classification.

20 Claims, 10 Drawing Sheets

(56) References Cited

OTHER PUBLICATIONS

Andrew J. Viterbi, et al., "Nonlinear Estimation of PSK-Modulated Carrier Phase with Application to Burst Digital Transmission", IEEE Transactions on Information Theory, vol. IT-29, No. 4, Jul. 1983.

Yinwen Cao, et al., "Frequency Estimation for Optical Coherent MPSK System Without Removing Modulated Data Phase", IEEE Photonics Technology Letters, vol. 22, No. 10, May 15, 2010.

Sebastian Hoffmann, et al., "Frequency and Phase Estimation for Coherent QPSK Transmission With Unlocked DFB Lasers", IEEE Photonics Technology Letters, vol. 20, No. 18, Sep. 15, 2008.

Andreas Leven, et al., "Frequency Estimation in Intradyne Reception", IEEE Photonics Technology Letters, vol. 19, No. 6, Mar. 15, 2007.

Mehrez Selmi, et al., "Accurate Digital Frequency Offset Estimator for Coherent PolMux QAM Transmission Systems", ECOC 2009, Sep. 20-24, 2009, Vienna, Austria.

Sebastian Hoffmann, et al., "Multiplier-Free Real-Time Phase Tracking for Coherent QPSK Receivers", IEEE Photonics Technology Letters, vol. 21, No. 3, Feb. 1, 2009.

Matthias Seimetz, "Laser Linewidth Limitations for Optical Systems with High-Order Modulation Employing Feed Forward Digital Carrier Phase Estimation", 2008 Optical Society of America, OFC/NFOEC 2008.

* cited by examiner

BLIND CARRIER FREQUENCY OFFSET DETECTION FOR COHERENT RECEIVERS USING QUADRATURE AMPLITUDE MODULATION FORMATS

BACKGROUND

1. Technical Field

Exemplary embodiments are related to detecting blind carrier frequency offset, and more particularly to detecting and/or correcting frequency offset between a signal laser source of a transmitter and a local oscillator of a receiver in an optical system.

2. Brief Description of the Related Art

To meet the growing capacity demands in the core optical network, spectrally efficient techniques, such as digital coherent detection, have recently attracted attention. These techniques allow the use of advanced modulation formats, such as quadrature amplitude modulation (QAM) systems. However, high-order QAM modulation formats, such as QAM formats having an order of four symbols or higher, typically have smaller tolerance for frequency and phase noise because the Euclidian distance decreases. As a result, more robust frequency and phase tracking (i.e., carrier recovery) is typically required. Although frequency and phase tracking can be realized using training-based algorithms, conventional training-based algorithms generally require extra overhead, and thus, reduce the achievable spectral efficiency (SE).

Conversely, blind carrier recovery typically does not require overhead making it more attractive for optical systems. Blind carrier frequency recovery for quadrature phase-shift-keying (QPSK) systems has been widely investigated. Conventional blind carrier frequency recovery in QPSK systems can use an M-th power algorithm to erase the data modulation, after which the frequency offset (between the received signal source and the local oscillator) is determined by the phase rotation speed of the data-erased signal through either fast Fourier transform (FFT)-based methods or time-domain based slope detection methods. FFT-based blind carrier frequency recovery methods have recently been extended from QPSK systems to high-order QAM systems.

A conventional FFT-based carrier frequency recovery method utilizes an Mth-power algorithm to transform the received symbol such that they exhibit a FFT peak at M times the frequency offset. However, for high-order QAMs, only a fraction of data modulation can be erased by the Mth power algorithm. Therefore, an extremely large FFT size is required for reliable and accurate frequency recovery. For example, because the Mth-power algorithm typically only erases the data modulation of a small portion of the symbols for high-order QAM formats, FFT sizes of greater than 8000 are typically required for 64 QAM.

The conventional FFT-based method uses two serially and sequentially implemented FFTs to detect both the frequency magnitude and sign. The level of complexity for such an implementation essentially makes these conventional approaches unrealistic for practical applications. The first FFT estimates the frequency magnitude. The frequency offset of the signal is then "removed" using a guessed sign, and applied to the second FFT. If the second FFT yields a higher frequency offset, then the opposite sign is correct; otherwise, the guessed sign is correct. Though this method is very effective, it not only doubles the computational complexity from one FFT to two FFTs, but it also increases the computational time, as the input of the second FFT depends on the output of the first FFT, and therefore the FFT's cannot be computed in parallel.

Digital phase locked loop (PLL)-based blind carrier recovery algorithms have been widely used in wireless systems to perform simultaneous frequency and phase tracking However, this type of algorithm cannot typically be used for high-speed optical systems. Unlike wireless systems, in which the change in frequency and phase offsets are relatively similar and slow, the characteristics of frequency and phase offsets in optical systems differ in that the frequency change is relatively slow (in the milliseconds for high-quality laser) but the range can be large (>100 MHz). Additionally, linewidth-related phase noise typically varies quickly when compared to wireless systems (in the nanoseconds) which can result in poor performance of phase lock loop (PLL)-based algorithms due to the intrinsic feedback delay. Furthermore, optical systems typically require heavily parallel processing that further degrades the performance of PLL-based algorithms.

SUMMARY

In one aspect, a carrier frequency recovery system for optical high-order quadrature amplitude modulated signals is disclosed. The carrier frequency recovery system includes a preprocessor and a recovery unit. The preprocessor classifies symbols associated with an optical high-order quadrature amplitude modulated signal. The recovery unit detects a magnitude and a sign associated with a frequency offset. The frequency offset is associated with the optical high-order quadrature amplitude modulated signal. The recovery unit uses a first fast Fourier transform to determine the magnitude associated with the frequency offset and uses a sign detector to determine the sign associated with the frequency offset.

In some embodiments, the preprocessor can include a symbol classifier, an interpolator, and/or a down sampler. The symbol classifier can classify symbols using ring-based constellation classification to associate symbols associated with the optical quadrature amplitude modulated signal with symbol classes. A first symbol class can be used for carrier frequency estimation. The interpolator can replace a second symbol class with a symbol associated with the symbol class. The down sampler can reduce a sampling rate associated with the optical quadrature amplitude modulated signal following classification of the symbols associated with the optical quadrature amplitude modulated signal.

In some embodiments, the recovery unit can include a data modulation eraser, a sign determination unit, and/or a signal inverter. The data modulation eraser can generate a de-rotated phase angle signal. The de-rotated phase angle can be generated in response to a preprocessed signal that is output from the preprocessor. The preprocessed signal is associated with the optical quadrature amplitude modulated signal. The sign determination unit can receive output signals from the first and second fast Fourier transforms and to determine a sign associated with the de-rotated phase angle signal. The signal inverter can receive a magnitude output signal from the first fast Fourier transform and a sign output signal from the sign determination unit. The signal inverter changes a sign associated with the magnitude output signal in response to the sign output signal.

In some embodiments, the sign detector uses a second fast Fourier transform to determine the sign associated with the frequency offset. The first and second fast Fourier transforms can be configured to perform parallel computations. In some embodiments, the sign detector can include a one-tap digital filter to determine a sign associated with the de-rotated phase angle signal.

In another aspect, a receiver associated with an optical communication network is disclosed. The receiver includes a blind frequency recovery system. The blind carrier frequency recovery system includes a preprocessor and recovery unit. The preprocessor classifies symbols associated with a received signal using ring-based constellation classification. The recovery unit determines a sign associated with a frequency offset. The recovery unit determines a magnitude associated with the frequency offset based on the ring-based constellation classification of the received signal. The frequency offset is associated with the received signal.

In some embodiments, the blind frequency recovery system of the receiver includes a symbol classifier to classify the symbols associated with the received signal using the ring-based constellation classification. The symbol classifier associates the symbols associated with the received signal with symbol classes. A first symbol class being used for carrier frequency estimation.

In some embodiments, the recovery unit of the receiver uses a first fast Fourier transform to determine a magnitude of the frequency offset. The recovery unit uses a sign detector to determine a sign of the frequency offset. The first and second fast Fourier transforms can be implemented in parallel. In some embodiments, the recovery unit includes a data modulation eraser to generate a de-rotated phase angle signal. The de-rotated phase angle is generated in response to a preprocessed signal being output from the preprocessor. The preprocessed signal is associated with the received signal.

In some embodiments, the sign detector includes a second fast Fourier transform to determine the sign associated with the frequency offset. The first and second fast Fourier transforms can be configured to perform parallel computations. The sign detector can include a sign determination unit to receive output signals from the first and second fast Fourier transforms and to determine a sign associated with the de-rotated phase angle signal.

In yet another aspect, a method for recovering a carrier frequency associated with a high-order quadrature amplitude modulated signal in a communication system is disclosed. The method includes classifying symbols associated with the high-order quadrature amplitude modulated signal based on an incoming one-sample-per-symbol high-order QAM signal and generating a de-rotated phase angle signal based on the classification of symbols. The method also includes determining a frequency magnitude associated with the de-rotated phase angle signal and determining a sign associated with the de-rotated phase angle signal. The frequency magnitude and the sign associated with the de-rotated phase angle being determined in parallel.

In some embodiments, classifying symbols can include classifying symbols using ring-based classification to associate the symbols with symbol classes. The classification of symbols can use an outermost ring to determine a first symbol class.

In some embodiments, the method can include down-sampling the high-order quadrature amplitude modulated signal after classifying the symbols and before generating the de-rotated phase angle to generate a down-sampled signal. The down-sampling reducing a sample rate associated with the high-order quadrature amplitude modulated signal.

In some embodiments, determining the sign associated with the de-rotated phase angle includes comparing output signals from the first and second fast Fourier transforms. In some embodiments, the sign associated with the de-rotated phase angle signal can be determined using a one-tap digital filter.

The frequency magnitude and the sign associated with the de-rotated phase angle can be determined using fast Fourier transforms configured for parallel computation. A first fast Fourier transform determines a magnitude associate with the frequency offset. A second fast Fourier transform determines a sign associated with the frequency offset. The first and second fast Fourier transforms are implemented in parallel. The frequency offset is associated with the high-order quadrature amplitude modulated signal.

Any combination of the above features is envisaged. Other objects and features will become apparent from the following detailed description considered in conjunction with the accompanying drawings, wherein like reference numerals in the various drawings are utilized to designate like components. It is to be understood, however, that the drawings are designed as an illustration only and not as a definition of the limits of the invention.

DETAILED DESCRIPTION

Exemplary embodiments are directed to a blind carrier recovery system for blind detection and correction of carrier frequency offset between the signal laser source and local oscillator (i.e., carrier frequency recovery) for optical systems employing quadrature amplitude modulation (QAM). Exemplary embodiments can be implemented using an improved fast Fourier frequency (FFT) based approach and can reduce the size of the FFTs in the system by more than one order of magnitude relative to conventional approaches to blind carrier recovery systems. Some embodiments can include a frequency sign detection technique that uses parallel, concurrently implemented FFTs having a modified FFT architecture. Some embodiments can include a frequency sign detection technique that uses time-domain slope detection based on constellation classification. Embodiments of the sign detection techniques provide a more efficient and simple solution to detection and correction of offset frequency than conventional approaches, which typically employ serial, sequentially implemented FFTs to determine the sign of the frequency offset.

Figure 1:
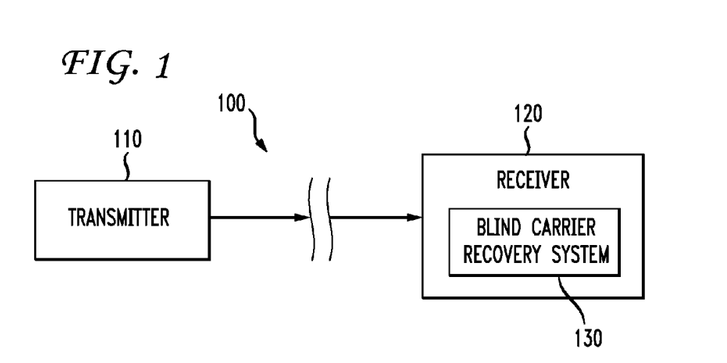
FIG. 1 is an exemplary optical link in an optical communication network.

FIG. 1 is an exemplary optical link 100 in a Quadrature Amplitude Modulation (QAM) optical communications network. The link 100 can include a transmitter 110 and a receiver 120. The transmitter 110 can include a laser source for generating and transmitting a high-order QAM signal to the receiver 120. The order of a QAM signal refers to the number of the different symbols that can be transmitted using QAM. For example, in a binary format, there are two symbols "0" and "1" and in a fourth order QAM signal, there are four symbols "00", "01", "10", and "11". The receiver 120 can receive and process the signal. The receiver can include a blind carrier recovery system 130 to detect and correct for frequency offset between the laser source in the transmitter 110 and a laser source in a local oscillator of the receiver 120.

Figure 2:
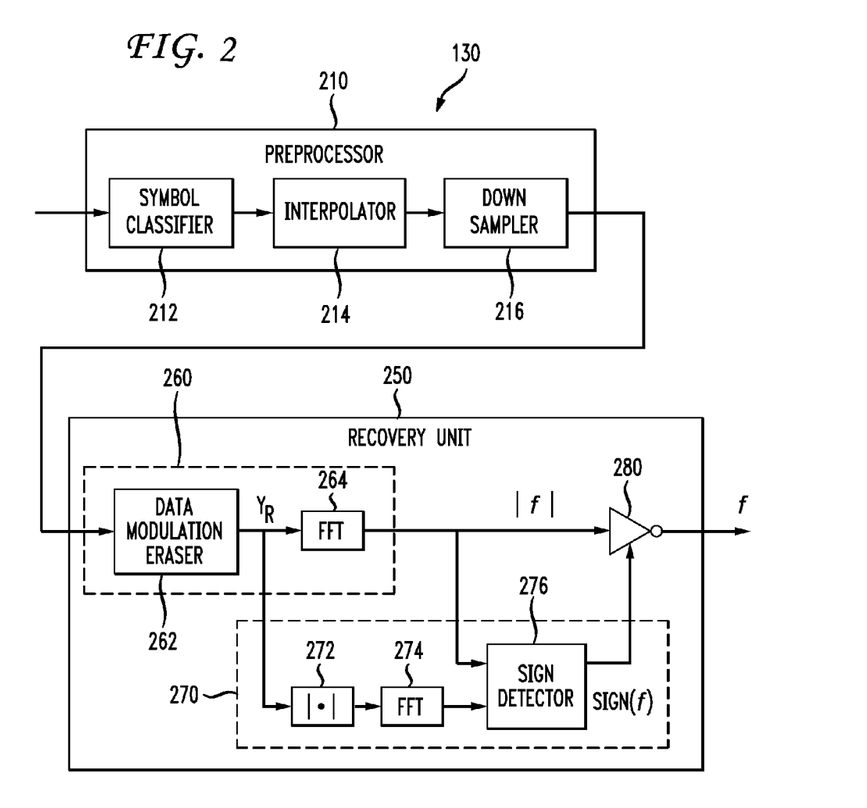
FIG. 2 is an exemplary blind carrier recovery system to facilitate recovery of a magnitude and sign of a frequency offset between a source laser at a transmitter and a local oscillator laser at a receiver in a fiber optic communication system.

FIG. 2 is an exemplary embodiment of the blind carrier recovery system 130. The system 130 can include a preprocessing section 210 and a frequency and magnitude determination section 250. The system 130 can be configured to detect and correct for frequency offset by performing preprocessing on an incoming high-order QAM signal (e.g., a QAM format having four or more symbols) and subsequently detecting a magnitude and sign of the frequency offset. The recovery section 120 can include a magnitude detector 260 and a sign detector 270. A symbol represents a state of the signal.

The preprocessor section 210 receives a one-sample-per-symbol high-order QAM signal for processing, and can include a symbol classifier 212, an interpolator 214, and a down sampler 216. The preprocessing section 210 can classify the symbols, interpolate between symbols, and perform down-sampling of the signal. Embodiments of the symbol classifier 212 can implement constellation classification for carrier frequency estimation. While the concept of constellation classification has been proposed for phase estimation of a QAM signal, it has been found to perform poorly for high-order QAM phase estimation. However, it has been determined that constellation classification can be a good solution for carrier frequency estimation because changes in carrier frequency occur more slowly in a time scale than phase noise. In constellation classification, constellation points are classified into class I (points whose data modulation can be removed by rotating M times) and class II (points whose data modulation cannot be removed). Only class I signals are typically used for frequency estimation.

Figure 3A:
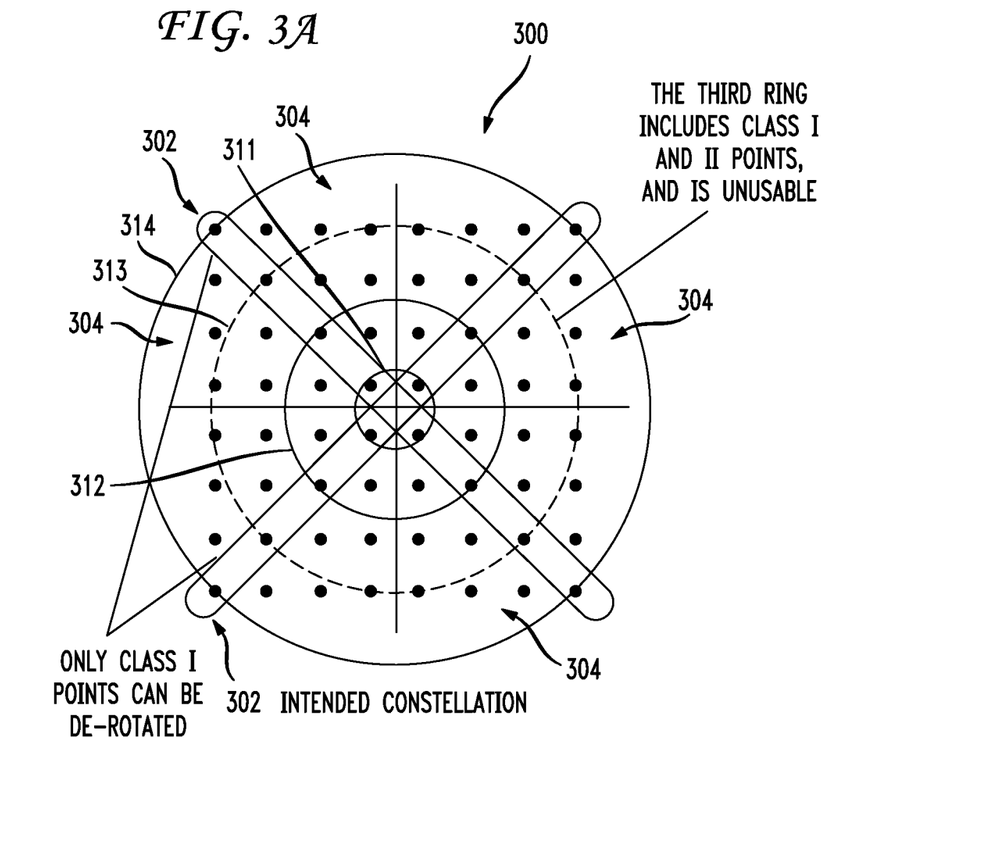
FIG. 3 illustrates an exemplary ring-based constellation classification.
Figure 3B:
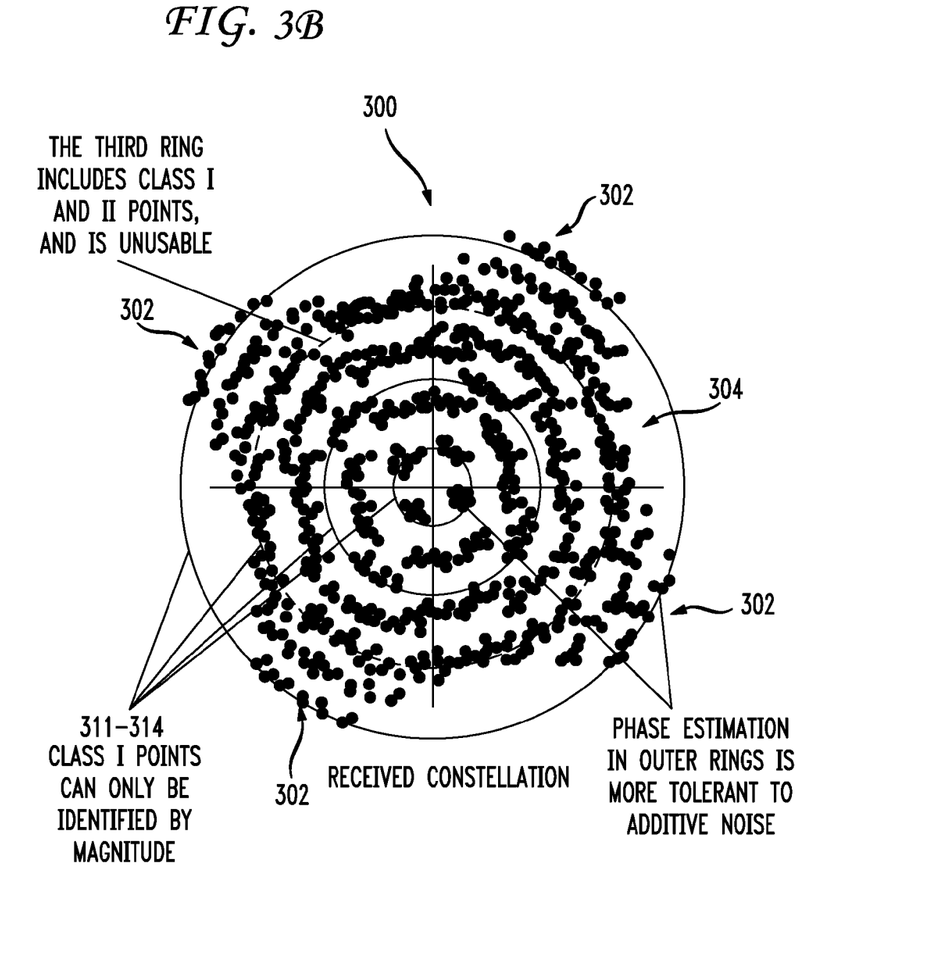

The constellation classification can be implemented using ring-based classification. For example, FIGS. 3a-b show ring-based constellation classification 300 applied to a 64 QAM signal. FIG. 3a shows an intended constellation and FIG. 3b shows an exemplary received constellation. class I points 302 are identified by four rings 311-314, which intersect the transmitted symbols that lie on a perfect diagonal. These symbols can be de-rotated using the Mth power algorithm. Symbols are classified as class I points 302 if their magnitude is closest to a class I ring 320, and as class II points 304 if not closest to a class I ring 320.

Once received symbols have been classified, the class II 304 points need not only be removed, but replaced with class I points 302 using the interpolator 214. In some embodiments, the interpolator 214 can interpolate the phase angles of the class II points such that there is a smooth, linear transition. In some embodiments, the interpolator can use nearest neighbor interpolation, in which class II points 304 are replaced by their most current previous class I point 302.

Significant FFT size reduction can be achieved by using only the class I symbols for the carrier frequency estimation, especially if class I points 302 that do not lie in the outermost ring 314 are rejected. This is because noise robustness increases as the magnitude of the received symbol increases. The effect, as shown in FIGS. 4a-d and 5a-d, is that the sawtooth-like appearance of the symbol angles is cleaner and more regular, producing cleaner FFT peaks.

Figure 4A:
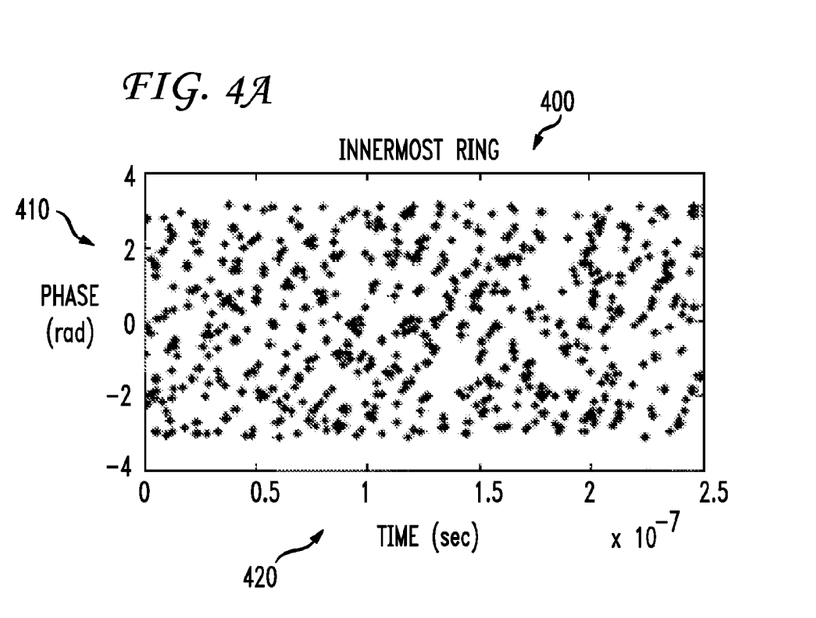
FIGS. 4a-d show exemplary sawtooth waveforms used to perform symbol classification.
Figure 4B:
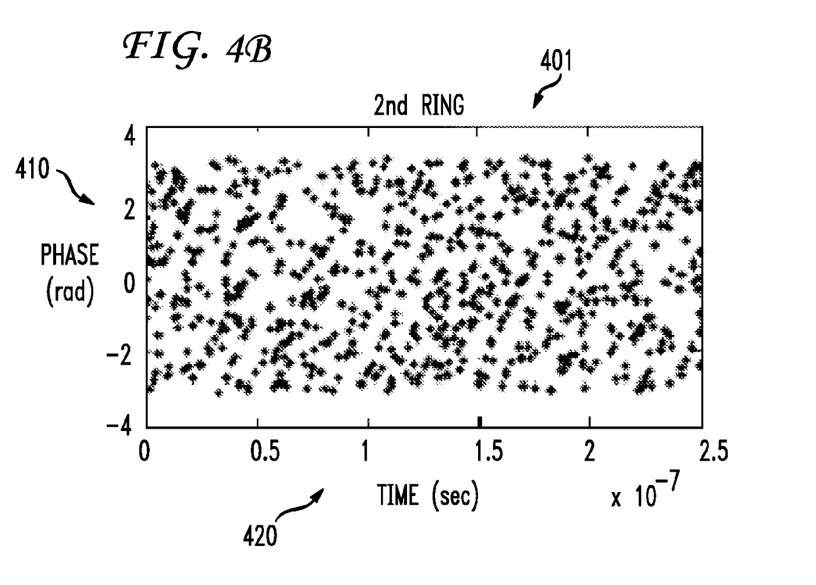
Figure 4C:
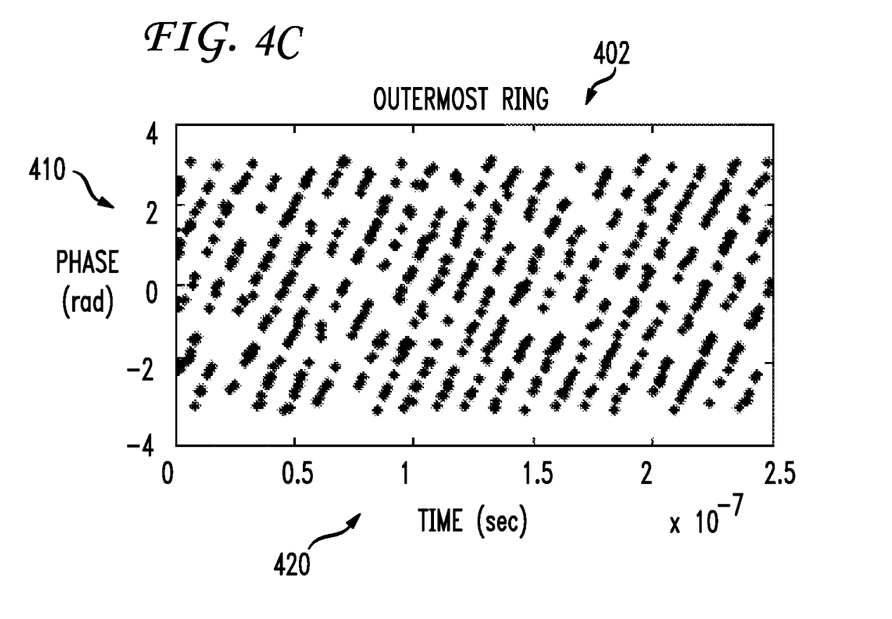
Figure 4D:
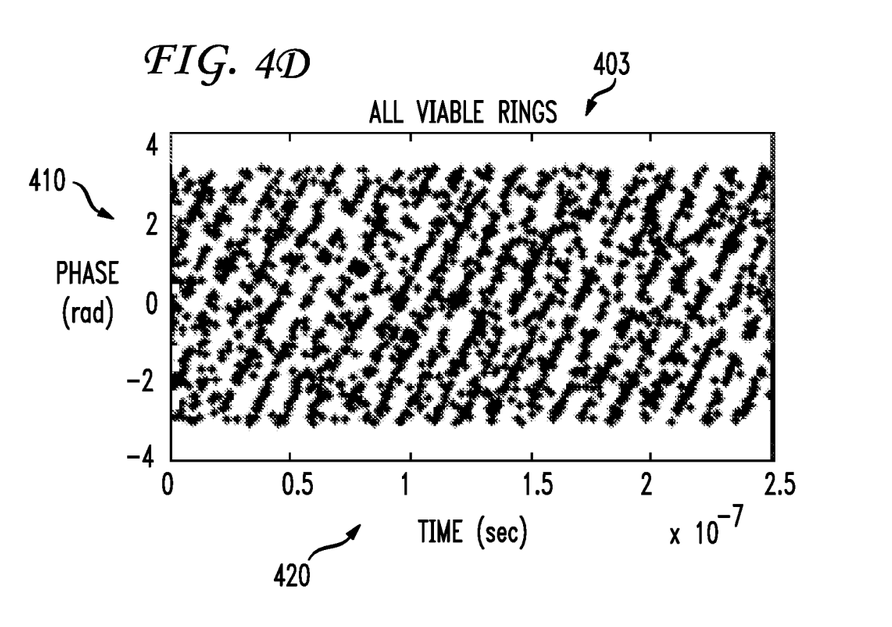

FIGS. 4a-d show exemplary plots 400-403, respectively, of phase 410 versus time 420 for points in the constellation. FIG. 4a shows the plot 400 for points corresponding to the innermost ring 311 (FIG. 3b). FIG. 4b shows the plot 401 for points corresponding to the ring 312 (FIG. 3b). FIG. 4c shows the plot 402 for points corresponding to the ring 314 (FIG. 3b). FIG. 4d shows the plot 403 for points corresponding to the rings 311-314 (FIG. 3b). As shown in FIGS. 4a-d, the plot 402 presents the cleanest sawtooth waveform and can be used to produce the cleanest FFT peaks by FFTs 164 and 174. Despite significant decrease in number of usable samples as a result of selecting only class I points 302 that lie in the outermost ring 314 (e.g., only 1/16 of received points can be used for 64 QAM), the advantage in FFT peak quality is still present.

Figure 5A:
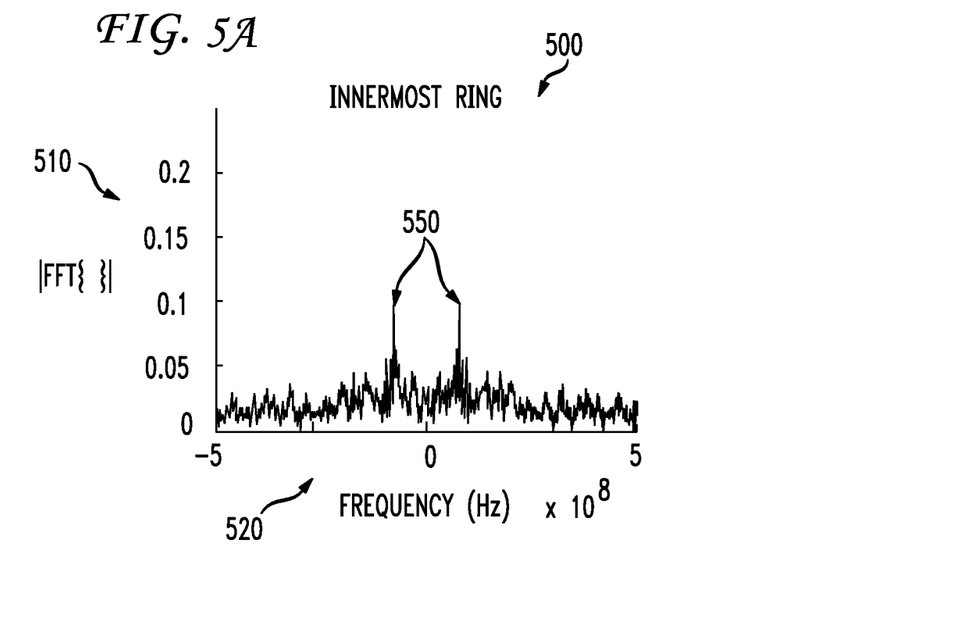
FIGS. 5a-d show an exemplary fast Fourier transform (FFT) peak based on symbol classification.
Figure 5B:
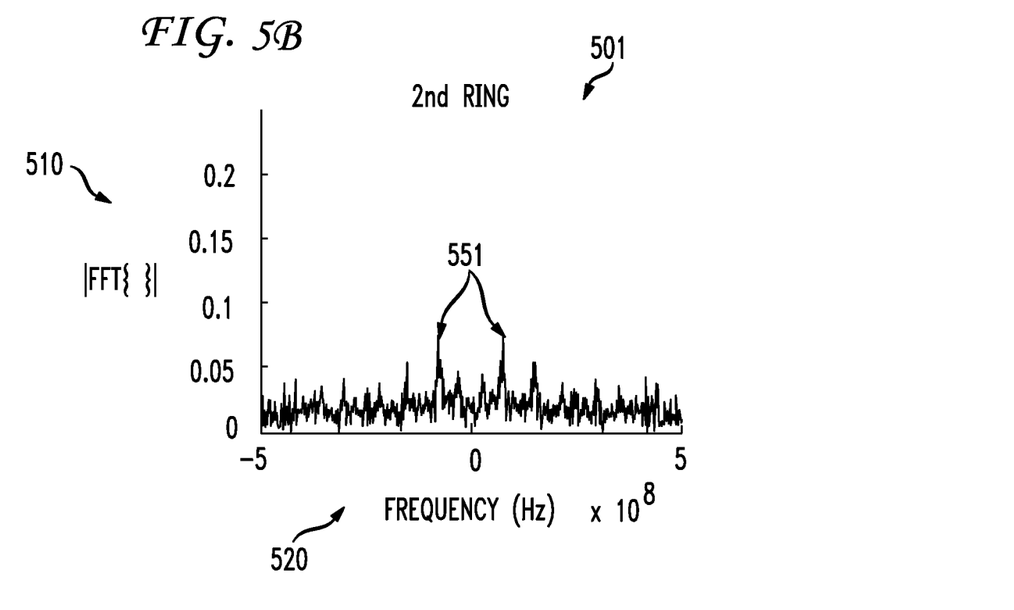
Figure 5C:
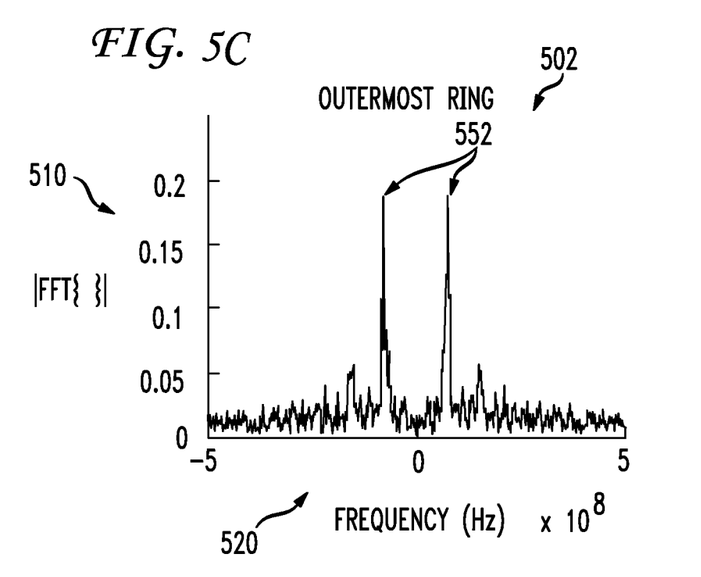
Figure 5D:
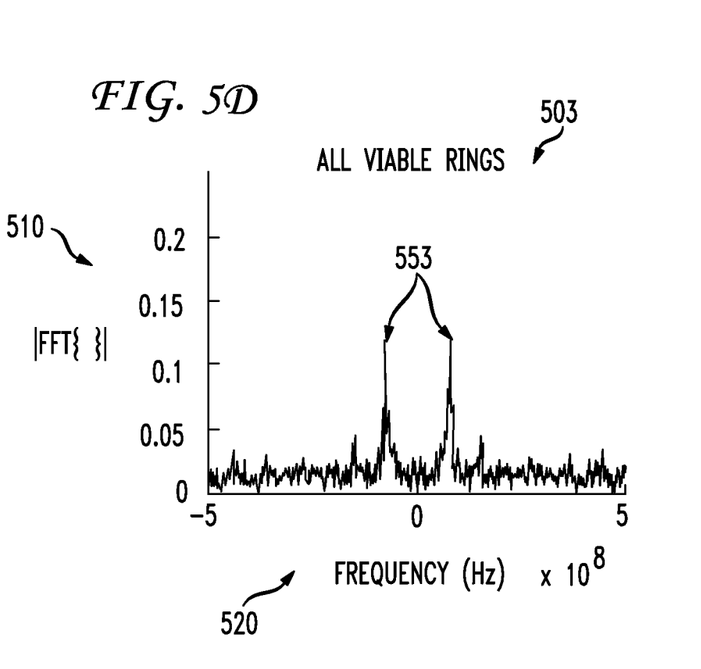

FIGS. 5a-d show exemplary plots 500-503, respectively, of magnitude 510 versus frequency 520 for points in the constellation. FIG. 5a shows the plot 500 having FFT peaks 550 for points corresponding to the innermost ring 311 (FIG. 3b) and plot 400 (FIG. 4a). FIG. 5b shows the plot 501 having FFT peaks 551 for points corresponding to the innermost ring 312 (FIG. 3b) and plot 401 (FIG. 4b). FIG. 5c shows the plot 502 having FFT peaks 552 for points corresponding to the innermost ring 314 (FIG. 3b) and plot 402 (FIG. 4a). FIG. 5d shows the plot 503 for points having FFT peaks 555 corresponding to the ring 311-314 (FIG. 3b) and plot 403 (FIG. 4a). As shown in FIGS. 5a-d, the FFT peaks 552 in plot 502 corresponding to the outermost ring 314 extend the furthest from the noise floor, and therefore, have the greatest magnitude. Thus, using points from the outermost ring 314 can be used to produce the cleanest FFT peaks.

After symbol interpolation is performed by the interpolator 214, the signal can be down-sampled using the down sampler 216. The down sampler 216 can reduce the sampling rate of the signal, and therefore, can reduce the size of the signal. The FFT size can be further reduced by performing down-sampling because the carrier frequency offset is typically controlled to be below several hundreds of MHz that is much smaller than the symbol rate for high-speed systems. The minimum sample rate Fs is determined by the sampling theory given by $Fs=2 \cdot M \cdot \Delta f_{max}$ where $\Delta f_{max}$ denotes the maximum carrier frequency offset and M is an integer number used in the following phase-rotation stage (for erasing data modulation).

The recovery section 250 can receive the preprocessed signal from the preprocessor section 210 and can erase the data modulation of preprocessed signal. After the data modulation of the preprocessed signal is erased, the recovery section 250 can detect the frequency magnitude and sign. The recover section 250 can include a magnitude detector 260, a sign detector 270, and a signal inverter 280. The magnitude detector 260 can include a data modulation eraser 262 and a first fast Fourier transform (FFT) 264. The sign detector can include an absolute magnitude generator 272, a second FFT 274, and a sign determination unit 276.

The data modulation eraser 262 of the magnitude section 260 can use the multiplier-free rounding and subtraction algorithm, which is equivalent to the classic Mth-power algorithm. For example, the data modulation eraser can apply equation 1 below to determine the de-rotated phase angle $Y_R$ of the preprocessed signal.

$$Y_R = \mathrm{mod}\left(\mathrm{angle}(\cdot) \cdot \frac{2\pi}{M}\right), \quad (1)$$

where "angle(·)" represents an operation for determining the phase angle of the preprocessed signal, "mod" represents the modulo operation, and "M" represents modulation order.

The data modulation eraser can rotate the phase of the down-sampled signal and can output the signal to the FFT 264 to determine the frequency offset magnitude based on a FFT peak of the rotated phase angles, and can output the signal to the absolute magnitude generator 272 of the sign detector 270 to determine the sign of the frequency offset.

The first FFT 264 can be implemented to compute a discrete Fourier transform (DFT) for the preprocessed, down sampled, data modulation erased signal received by the FFT 264. The FFT 264 can determine the magnitude of the frequency offset based on an FFT peak. The output of the FFT 254 can be transmitted to an input of the sign detector 260 and to the signal inverter 280.

The absolute magnitude generator 272 of the sign detector 270 can receive the signal output from the data modulation eraser 262 and can generate a reference signal that represents the absolute magnitude of the de-rotated phase angle signal $Y_R$. The reference signal can be an unsigned signal and can represent an absolute value of the de-rotated phase angle signal $Y_R$ adjusted to have a zero mean. The reference signal can be output from the generator 272 to the second FFT 274. The FFT 274 can receive the reference signal and can compute a discrete Fourier transform (DFT) for the reference signal. The output of the FFT 274 can be output to the sign determination unit 276.

Frequency sign detection can be a challenging problem in FFT-based approaches because peaks appear at both Δf and |Δf|. To improve latency and reduce complexity, the system 100 can implement the first and second FFTs 264 and 274 for sign detection in parallel. In this regard, the output of the data modulation eraser 262 can be operatively coupled to an input of the first FFT 264 and can be operatively coupled to the second FFT 274 via the absolute magnitude generator 272. The architecture and implementation of the FFTs 264 and 274 can reduce the computational complexity of the FFTs 264 and 274 to approximate the computational complexity of a single FFT.

Figure 6:
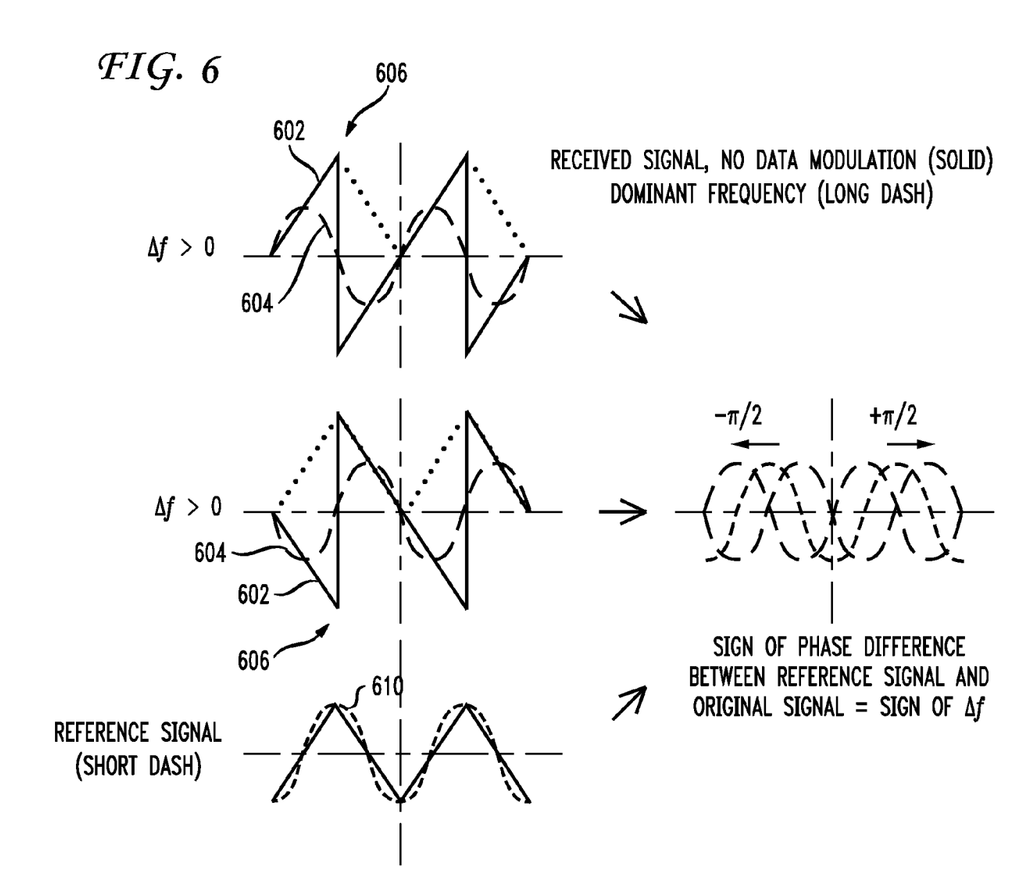
FIG. 6 illustrates exemplary waveforms for determining a sign associated with a signal.

The sign determination unit can receive the output of the FFTs 264 and 274 in parallel and can determine a sign associated with the frequency offset between the transmission laser source and the laser for a local oscillator at a receiver. FIG. 6 shows exemplary waveforms received by the sign determination unit. For example, if the phase angle is limited to [−π,π], the phase angle of data-erased signal will be a sawtooth wave, with slope Δf. Using knowledge of the Fourier series, the first frequency component of a perfectly centered sawtooth wave 602 is a sine wave 604 of the same frequency. The sign of the sawtooth wave 602 can then be determined by finding the sign of the sine wave 604 since the slope at time equal to 0 (t=0) is the same in both waves. The sign of the fundamental sine wave 604 corresponding to the sawtooth wave 602 can then be found from the complex FFT output, in that the phase angle of the first peak should be $$\frac{\pi}{2} \text{ if } \Delta f > 0,$$

and $$-\frac{\pi}{2} \text{ if } \Delta f < 0.$$

It can be difficult to ensure that the sawtooth 602 is properly centered, especially at high frequencies where the sampling is sparse to reduce FFT complexity. For this reason, the FFT peak angle can be measured indirectly by the sign determination unit 176 by comparing the FFT peak angle to that of the peak angle of the reference signal 610, which, regardless of the sign of Δf, will be a triangle wave. FIG. 6 shows that, regardless of where the sawtooth 602 lies in the sampling window, the phase difference between the reference signal 610 and the incoming signal will have the same sign as the slope of the sawtooth wave 604, and therefore the slope of Δf.

Referring again to FIG. 2, the output of the FFT 164 is an input to the inverter 280 as a magnitude signal. The output of the sign determination unit 276 is input to the inverter 280 as a control signal to change the sign of the magnitude signal received from the FFT 264. The signal inverter is controlled by the output of the sign determination unit 276 to assign the appropriate sign to the magnitude signal. The output of the inverter 280 represents the frequency offset having a magnitude and sign determined by the system 100.

Figure 7:
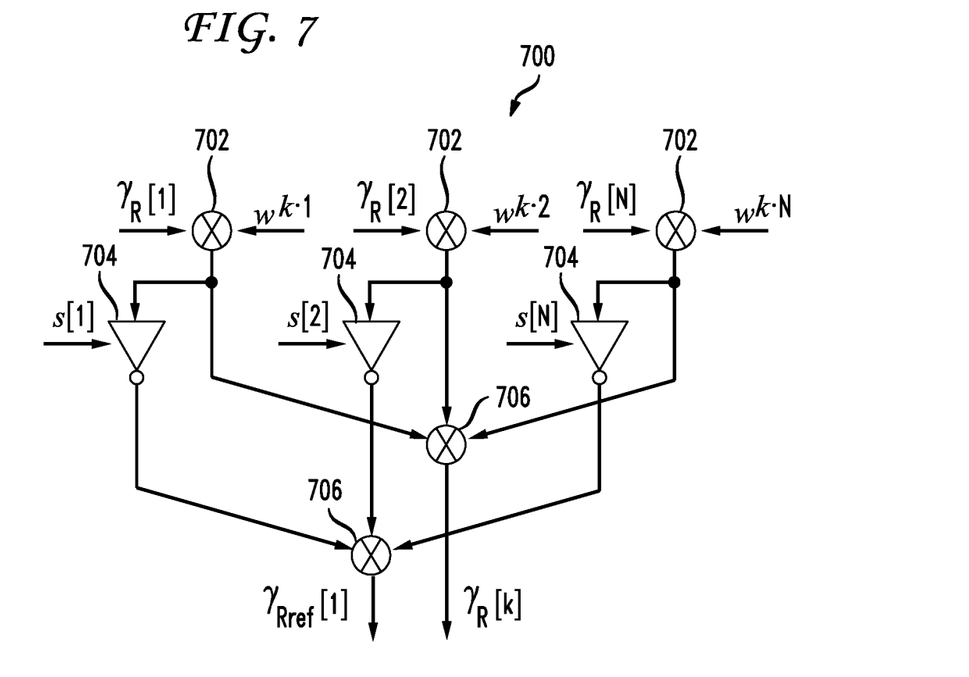
FIG. 7 shows an exemplary FFT architecture implemented in embodiments of a blind carrier frequency recovery system.

FIG. 7 shows an exemplary FFT architecture 700 that can be implemented for parallel and concurrently implemented embodiments of the FFTs 164 and 174. Thus, the architecture 700 represents both FFTs 164 and 174 implemented together. The implementation complexity of the embodiments of the parallel and/or concurrently implemented FFT-based frequency sign detection approach can be simplified by using the modified FFT architecture 700, which can compute the FFT of the preprocessed signal and reference signal together without adding a substantial amount of overhead. The FFT architecture 700 is achieved by observing similarities in computing the FFT of $\gamma_R$ and $|\gamma_R|$, where $\gamma_R$ denotes the de-rotated phase angle and $|\gamma_R|$ denotes the absolute value of the de-rotated phase angle. Typically, computation of the twiddle factors ($w^{nk}=e^{2\pi jnk}$) can be one of the most complex computations performed by an FFT. The architecture of the system 100, which uses two parallel implemented FFTs 164 and 174, allows the twiddle factors to be shared in the FFTs 164 and 174. The remaining computational requirements are L 1-bit sign registers, L inverters, and L−1 adders, where L is the length of the FFTs.

For example, in the present embodiment, the FFT architecture 700 can include can include N multipliers 702 to compute the product between the de-rotated phase angle signal output from the data modulation eraser and the twiddle factors. The output of each multiplier 702 can be operatively coupled to an inverter 704 and an adder in parallel. The output of each inverter 704 can be input to an adder 706 and the output of the multipliers 702 can be input to an adder 708. The output of the adder 706 can represent the frequency response associated with the reference signal and the output of the adder 708 can represent the frequency response of the de-rotated phase angle signal.

Using a 38 Gbaud 64 QAM signal as an example, a detailed numerical investigation to determine the probability of frequency estimation error versus received optical signal-to-noise ratio (OSNR) under a variety of carrier frequency offsets was performed to quantitatively evaluate embodiments of the system 100. A laser linewidth=100 kHz for both the signal laser source at the transmitter and the local oscillator at the receiver was assumed. For FFT-based frequency detection, frequency detection is either correct to within the precision allowed by the FFT parameters, or completely incorrect. It is typically not the case that with more noise, the estimate degrades gradually. This is because performance typically depends on whether the frequency offset peak is above the noise floor. If not, an incorrect peak can be selected. For this reason, performance is more accurately measured, not by the error in frequency measurement, but in the probability that frequency magnitude is detected correctly. In FIG. 12a, a simulated result is shown for an embodiment of the system having a FFT size of 512 and sampling rate of 1.73 GHz.

High-order M-QAM is a promising modulation format to realize high-spectral efficiency optical transmission, such as at data rates beyond 100-Gb/s. To be able to correctly detect a QAM signal at the receiver side, an accurate carrier frequency tracking algorithm capable of tolerating large carrier frequency offset (e.g., a range>100 MHz) is indispensable for the practical implementation of high-speed QAM system. Although accurate frequency tracking can be realized by using training based algorithms, these algorithms require extra overhead, and thus reduce the achievable spectral efficiency (SE). Conversely, blind carrier recovery does not require overhead, and is therefore more attractive for optical systems. Although a frequency tracking algorithm capable of tolerating frequency offset greater than 100 MHz based on a FFT-based carrier recovery algorithm exists, this algorithm requires an extremely large FFT size (and two sequential FFTs to detect both the magnitude and the sign) for high-order QAM, which makes it unrealistic for practical implementation in high-order QAM systems. Exemplary embodiments of the system can dramatically reduce implementation complexity (in some embodiments by more than a factor of 20) and thus, can be important for future high-speed optical systems using high-order QAM modulation formats.

Exemplary embodiments provide improved FFT-based blind frequency tracking for coherent receivers employing high-order QAM modulation formats, which dramatically reduces FFT complexity by introducing a new ring-based constellation classification, previous neighbor interpolation, and down-sampling to reduce the required FFT size. Furthermore, exemplary embodiments provide two frequency sign detection approaches to further reduce the carrier frequency recovery complexity. The first one of the frequency sign detection approaches is based on two concurrent FFTs with a modified FFT architecture, and the second one is based on a time-domain slope detection algorithm that is enabled by the use of constellation classification.

Figure 8:
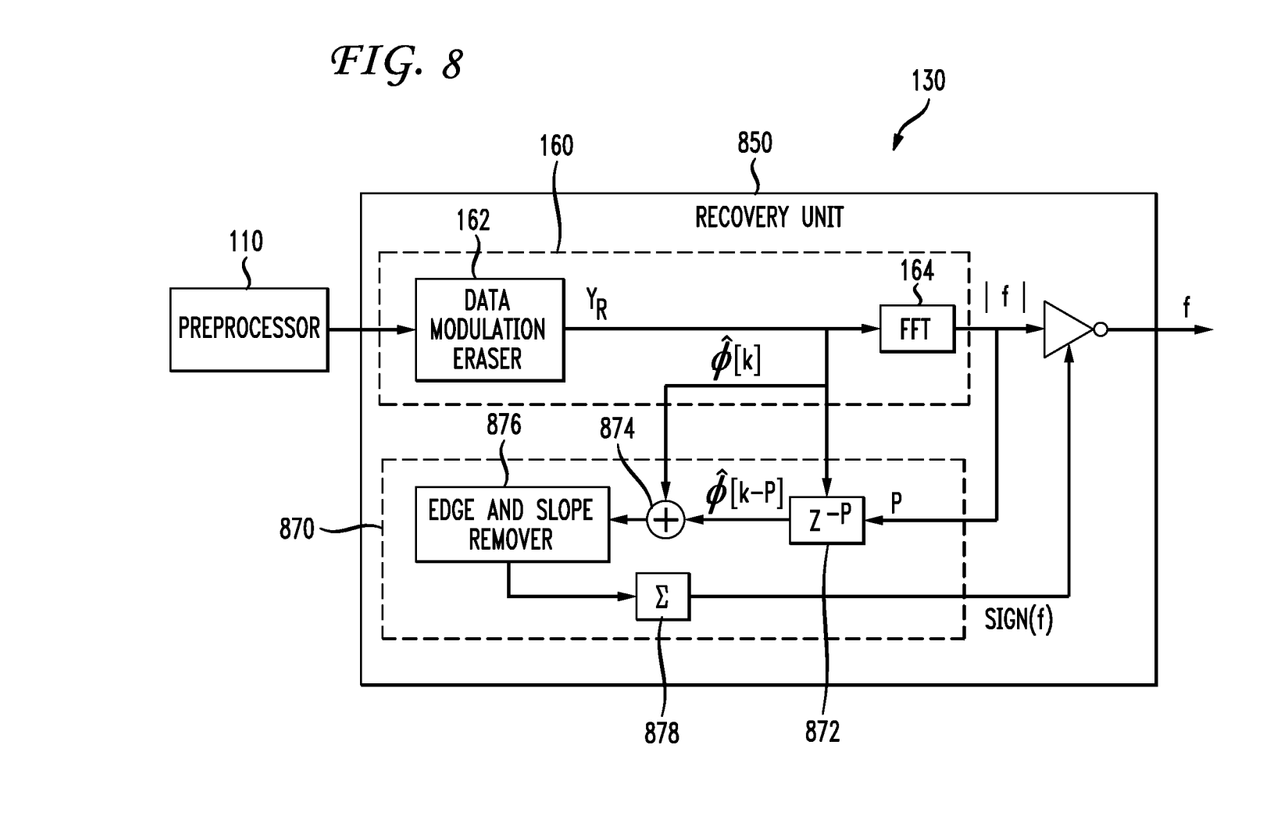
FIG. 8 is another exemplary embodiment of a blind carrier frequency recovery system.

FIG. 8 shows another exemplary embodiment of the blind carrier recovery system 130. In the present embodiment, the system 130 can include the preprocessor 210 and a recovery unit 650. The recovery unit 850 can include the magnitude detector 260, a sign detector 870, and the signal inverter 280. As shown in FIG. 4c, ring-based classification allows clear sawtooth-like appearance of the symbol angles. This property also enables a more hardware-efficient time-domain-based frequency sign detection that is based on an embodiment of system 130 shown in FIG. 8.

The sign detector 870 can be a one-tap digital filter having a delay unit 872, an adder 874, a edge/slope remover 876, and a summation unit 878. The sign detector can estimate the slope of the de-rotated phase angle $\gamma_R$, which resembles a sawtooth wave with slope $2\pi\Delta f$. The present embodiment shown in FIG. 8 potentially requires more memory, but the computation can be much less complex as it only requires adders and slicers (e.g., the edge/slope remover 876) without multipliers. The delay unit 872 can receive the de-rotated phase angle output from the data modulation eraser 162 and the output of the FFT 164. The output of the delay unit 872 can be input to the adder 874 along with the de-rotated phase angle. The adder can add the two signals and the summed signal to the edge/slope remover 876, which can remove the edges and slopes from the signal, and can output the signal to the summation unit 878. The summation unit can output the sign of the frequency signal, which can be used to control inverter 280 to change the sign of the magnitude signal received from the FFT 264. The signal inverter 280 is controlled by the output of the sign detector 870 to assign the appropriate sign to the magnitude signal. The output of the inverter 280 represents the frequency offset having a magnitude and sign determined by the system 100.

While exemplary embodiments have been described herein, it is expressly noted that the present invention is not limited to these embodiments, but rather the intention is that additions and modifications to what is expressly described herein are also included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A carrier frequency recovery system for optical high-order quadrature amplitude modulated signals, the carrier frequency recovery system comprising:
a preprocessor to classify symbols associated with an optical high-order quadrature amplitude modulated signal, wherein the preprocessor classifies symbols based on an incoming one-sample-per-symbol signal as associated with the optical high-order quadrature amplitude modulated signal; and
a recovery unit to detect a magnitude and a sign associated with a frequency offset, the frequency offset being associated with the optical high-order quadrature amplitude modulated signal classified based on an incoming one-sample-per-symbol signal, the recovery unit using a first fast Fourier transform to determine the magnitude associated with the frequency offset, the recovery unit using a sign detector to determine the sign associated with the frequency offset, the recovery unit further comprising a data modulation eraser to generate a de-rotated phase angle signal.

2. The system of claim 1, wherein the preprocessor uses ring-based constellation classification to associate symbols associated with the optical high-order quadrature amplitude modulated signal with symbol classes, a first symbol class being used for carrier frequency estimation.

3. The system of claim 2, wherein the preprocessor further comprises an interpolator to replace a second symbol class with a symbol associated with the symbol class.

4. The system of claim 2, wherein the preprocessor further comprises a down sampler to reduce a sampling rate associated with the optical high-order quadrature amplitude modulated signal following classification of the symbols associated with the optical high-order quadrature amplitude modulated signal.

5. The system of claim 1, wherein the data modulation eraser further comprises generating the de-rotated phase angle signal in response to a preprocessed signal being output from the preprocessor, the preprocessed signal being associated with the optical high-order quadrature amplitude modulated signal.

6. The system of claim 5, wherein the sign detector uses a second fast Fourier transform to determine the sign associated with the frequency offset, the first and second fast Fourier transforms being configured to perform parallel computations.

7. The system of claim 6, wherein the recovery unit further comprises a sign determination unit to receive output signals from the first and second fast Fourier transforms and to determine a sign associated with the de-rotated phase angle signal.

8. The system of claim 7, wherein the recovery unit further comprises a signal inverter to receive a magnitude output signal from the first fast Fourier transform and a sign output signal from the sign determination unit, the signal inverter changing a sign associated with the magnitude output signal in response to the sign output signal.

9. The system of claim 5, wherein the sign detector comprises a one-tap digital filter to determine a sign associated with the de-rotated phase angle signal.

10. A receiver associated with an optical communication network, the receiver comprising a blind frequency recovery system, the blind carrier frequency recovery system comprising:
   a preprocessor to classify symbols associated with a received optical high-order quadrature amplitude modulated signal using ring-based constellation classification; and
   a recovery unit to determine a sign associated with a frequency offset, the recovery unit to determine a magnitude associated with the frequency offset based on the ring-based constellation classification of the received optical high-order quadrature amplitude modulated signal, the frequency offset being associated with the received optical high-order quadrature amplitude modulated signal, the recovery unit further comprising a data modulation eraser to generate a de-rotated phase angle signal.

11. The receiver of claim 10, wherein the blind frequency recovery system further comprises a symbol classifier to classify the symbols associated with the received optical high-order quadrature amplitude modulated signal using the ring-based constellation classification, the symbol classifier associating the symbols associated with the received optical high-order quadrature amplitude modulated signal with symbol classes, a first symbol class being used for carrier frequency estimation.

12. The receiver of claim 11, wherein the recovery unit further uses a first fast Fourier transform to determine a magnitude of the frequency offset, the recovery unit using a sign detector to determine a sign of the frequency offset, the first and second fast Fourier transforms being implemented in parallel.

13. The receiver of claim 12, wherein the data modulation eraser further comprises generating the de-rotated phase angle signal in response to a preprocessed signal being output from the preprocessor, the preprocessed signal being associated with the received optical high-order quadrature amplitude modulated signal.

14. The system of claim 13, wherein the sign detector includes a second fast Fourier transform to determine the sign associated with the frequency offset, the first and second fast Fourier transforms being configured to perform parallel computations.

15. The receiver of claim 14, wherein the sign detector further comprises a sign determination unit to receive output signals from the first and second fast Fourier transforms and to determine a sign associated with the de-rotated phase angle signal.

16. A method to recover a carrier frequency associated with an optical high-order quadrature amplitude modulated signal in a communication system, the method comprising:
   classifying symbols associated with the optical high-order quadrature amplitude modulated signal based on an incoming one-sample-per-symbol high-order quadrature amplitude modulated signal;
   generating a de-rotated phase angle signal based on the classification of symbols;
   determining a frequency magnitude associated with the de-rotated phase angle signal; and
   determining a sign associated with the de-rotated phase angle signal, the frequency magnitude and the sign associated with the de-rotated phase angle being determined in parallel.

17. The method of claim 16, wherein classifying symbols comprises:
   classifying symbols using ring-based classification to associate the symbols with symbol classes, the classification of symbols using an outermost ring to determine a first symbol class; and
   down-sampling the optical high-order quadrature amplitude modulated signal after classifying the symbols and before generating the de-rotated phase angle to generate a down-sampled signal, the down-sampling reducing a sample rate associated with the optical high-order quadrature amplitude modulated signal.

18. The method of claim 16, wherein the frequency magnitude and the sign associated with the de-rotated phase angle are determined using fast Fourier transforms configured for parallel computation, a first fast Fourier transform determining a magnitude associate with the frequency offset, a second fast Fourier transform determining a sign associated with the frequency offset, the fast Fourier transforms being implemented in parallel, the frequency offset being associated with the optical high-order quadrature amplitude modulated signal.

19. The method of claim 18, wherein determining the sign associated with the de-rotated phase angle comprises comparing output signals from the fast Fourier transforms.

20. The method of claim 16, wherein the sign associated with the de-rotated phase angle signal is determined using a one-tap digital filter.

* * * * *